(12) United States Patent
Wang

(10) Patent No.: US 11,674,842 B2
(45) Date of Patent: Jun. 13, 2023

(54) OPTICAL SENSOR ARRANGEMENT

(71) Applicant: ams AG, Unterpremstaetten (AT)

(72) Inventor: Yu Wang, Plano, TX (US)

( * ) Notice: Subject to any disclaimer, the term of this patent is extended or adjusted under 35 U.S.C. 154(b) by 1159 days.

(21) Appl. No.: 16/079,990

(22) PCT Filed: Feb. 9, 2017

(86) PCT No.: PCT/EP2017/052891
§ 371 (c)(1),
(2) Date: Aug. 24, 2018

(87) PCT Pub. No.: WO2017/148678
PCT Pub. Date: Sep. 8, 2017

(65) Prior Publication Data
US 2019/0064354 A1  Feb. 28, 2019

(30) Foreign Application Priority Data

Mar. 4, 2016  (EP) ................................. 16158740

(51) Int. Cl.
| | | |
|---|---|---|
| G01S 17/02 | (2020.01) | |
| G01J 1/04 | (2006.01) | |
| G01S 7/481 | (2006.01) | |
| G01S 17/04 | (2020.01) | |
| G02B 5/08 | (2006.01) | |

(52) U.S. Cl.
CPC ........... *G01J 1/0437* (2013.01); *G01J 1/0414* (2013.01); *G01S 7/4813* (2013.01); *G01S 7/4814* (2013.01); *G01S 7/4816* (2013.01); *G01S 17/04* (2020.01); *G02B 5/08* (2013.01)

(58) Field of Classification Search
CPC combination set(s) only.
See application file for complete search history.

(56) References Cited

U.S. PATENT DOCUMENTS

| | | | |
|---|---|---|---|
| 6,424,407 B1 * | 7/2002 | Kinrot | G01D 5/347 345/166 |
| 6,580,495 B2 | 6/2003 | Shirai | |
| 8,400,409 B1 * | 3/2013 | Francis | G06F 3/044 345/173 |
| 2001/0050763 A1 * | 12/2001 | Shirai | G01S 17/36 356/5.1 |

(Continued)

FOREIGN PATENT DOCUMENTS

| | | |
|---|---|---|
| DE | 10122936 A1 | 11/2001 |
| EP | 2889654 A1 | 7/2015 |

(Continued)

*Primary Examiner* — Marcus H Taningco
(74) *Attorney, Agent, or Firm* — MH2 Technology Law Group, LLP

(57) ABSTRACT

An optical sensor arrangement comprises an optoelectronic device covered by a cover arrangement and being configured to emit or detect at least electromagnetic radiation with a first wavelength through an aperture of the cover arrangement. The optical sensor arrangement further comprises a mirror arrangement arranged between the optoelectronic device and the aperture and comprising a wavelength selective mirror with a passband and a stopband. The passband includes a first wavelength range including the first wavelength, the stopband includes a second wavelength range corresponding to visible light or vice versa.

16 Claims, 3 Drawing Sheets

(56) References Cited

U.S. PATENT DOCUMENTS

| | | | |
|---|---|---|---|
| 2002/0080307 A1* | 6/2002 | Kuroiwa | G02F 1/1309 |
| | | | 349/96 |
| 2004/0173680 A1* | 9/2004 | Mossberg | G06K 7/12 |
| | | | 235/454 |
| 2005/0077470 A1 | 4/2005 | Tichit et al. | |
| 2006/0119837 A1* | 6/2006 | Raguin | G06K 9/00046 |
| | | | 356/71 |
| 2012/0129580 A1 | 5/2012 | Tam | |
| 2013/0153772 A1 | 6/2013 | Rossi et al. | |
| 2016/0240721 A1* | 8/2016 | Chu | G01J 1/0437 |
| 2017/0038459 A1* | 2/2017 | Kubacki | G01S 7/497 |
| 2017/0074652 A1* | 3/2017 | Send | G01J 3/502 |
| 2017/0161544 A1* | 6/2017 | Fomani | G06K 9/00013 |
| 2020/0028001 A1* | 1/2020 | Mazzillo | H01L 25/167 |
| 2021/0190689 A1* | 6/2021 | Anazawa | B01L 3/502715 |

FOREIGN PATENT DOCUMENTS

| | | |
|---|---|---|
| WO | 2012/033467 A1 | 3/2012 |
| WO | 2013/065731 A1 | 5/2013 |

* cited by examiner

OPTICAL SENSOR ARRANGEMENT

BACKGROUND OF THE INVENTION

The present disclosure relates to an optical sensor arrangement, in particular a proximity sensor arrangement.

Optical sensors such as proximity sensors may be used widely in modern electronic devices as for example smart phones. An optical proximity sensor may be implemented as active sensor arrangement being able to detect the presence of a nearby object without physical contact. An optical proximity sensor may emit electromagnetic radiation, for example infrared radiation, and detect the radiation returning after being reflected by an object. Since the optoelectronic device emitting the radiation and the optoelectronic device detecting the radiation may be positioned adjacent to each other and the radiation may have to pass through a cover, for example a cover glass or a cover plastic with ink printed on it, radiation may get reflected by the cover or scattered by the ink and consequently be detected without having left the sensor arrangement and reached an object. This phenomenon is denoted as optical crosstalk and may lead to errors in the detection or reduce detection range and/or performance of the proximity sensor.

Existing approaches may use one aperture in the cover for both the emitting and the detecting device. A drawback of such approaches may be an increased optical crosstalk due to a relatively short distance between the emitting and the detecting device implied by the common aperture. Moreover, the aperture and the optoelectronic devices beneath the aperture are visible to the user of the electronic device, which may be undesirable for example for cosmetic reasons. Other approaches may use two separate apertures in the cover, one for the emitting device and one for the detecting device. However, the visibility of two apertures and the respective optoelectronic devices may be even less desirable.

SUMMARY OF THE INVENTION

The present disclosure provides an improved concept for an optical sensor arrangement, where an aperture and/or an optoelectronic device is disguised.

Herein, visible light denotes electromagnetic radiation with a wavelength in a range between or approximately between $4*10^{-7}$ m and $7*10^{-7}$ m. Infrared radiation denotes electromagnetic radiation with a wavelength in a range between or approximately between $7*10^{-7}$ m and $1*10^{-3}$ m. Furthermore, light refers to visible light and infrared radiation if not explicitly indicated otherwise.

According to the improved concept, an optical sensor arrangement with an optoelectronic device for emitting or detecting electromagnetic radiation is equipped with a mirror arrangement placed between the optoelectronic device and an aperture in a cover arrangement covering the optoelectronic device. The mirror arrangement comprises a wavelength selective mirror, in particular a hot or a cold mirror, having a passband and a stopband and being arranged to direct only electromagnetic radiation with certain wavelengths, in particular infrared radiation, from the optoelectronic device to the aperture and vice versa.

Electromagnetic radiation with other wavelengths, in particular visible light, is prevented by the mirror arrangement from propagating from the electronic device to the aperture or vice versa. Consequently, the optoelectronic device may not be visible by an observer outside of the optical sensor arrangement. Furthermore, if a color of a component of the sensor arrangement where the visible light is directed to is adapted to a color of the cover arrangement, also the aperture itself may not be visible or may have a reduced visibility from outside of the optical sensor arrangement.

According to the improved concept, an optical sensor arrangement comprising an optoelectronic device and a cover arrangement covering the optoelectronic device is provided. The optoelectronic device is configured to emit at least electromagnetic radiation with a first wavelength through an aperture of the cover arrangement or to detect at least electromagnetic radiation with the first wavelength entering the optical sensor arrangement through the aperture.

The optical sensor arrangement further comprises a mirror arrangement arranged between the optoelectronic device and the aperture, wherein the mirror arrangement comprises a wavelength selective mirror with a passband and a stopband. The passband includes a first wavelength range including the first wavelength, while the stopband includes a second wavelength range corresponding to visible light or the stopband includes the first wavelength range including the first wavelength, while the passband includes the second wavelength range corresponding to visible light.

According to some implementations of the sensor arrangement, the first wavelength corresponds to infrared radiation. For example the first wavelength has a value being greater than 700 nm, for example between 750 nm and 1400 nm, for example 850 nm or approximately 850 nm or 950 nm or approximately 950 nm.

According to some implementations of the sensor arrangement, the aperture, in particular an area of the cover arrangement corresponding to the aperture, is translucent or transparent for visible light and for electromagnetic radiation with the first wavelength. In particular, the aperture may be translucent or transparent for infrared radiation, in particular for infrared radiation with a wavelength within a range including the first wavelength.

According to some implementations of the sensor arrangement, the cover arrangement is opaque in an area surrounding the aperture. For example, the cover arrangement may be opaque in all areas of the cover arrangement except for the aperture and optional further apertures.

Here and throughout the remainder of the present disclosure, the expression "opaque" means opaque for visible light and for a range of infrared radiation. The range of infrared radiation may correspond to the first wavelength range or to another wavelength range including the first wavelength.

Here and throughout the remainder of the present disclosure, the expressions "translucent" and "transparent" mean translucent or transparent, respectively, for visible light and for a range of infrared radiation. The range of infrared radiation may correspond to the first wavelength range or to another wavelength range including the first wavelength.

According to some implementations of the sensor arrangement, the optoelectronic device is configured to emit the electromagnetic radiation with the first wavelength.

The optoelectronic device is for example implemented as a light emitting diode, LED, a laser diode or a vertical-cavity surface-emitting laser, VCSEL, in particular an infrared LED (also denoted infrared emitting diode, IRED or IR-LED), an infrared emitting laser diode or an infrared emitting VCSEL.

According to some implementations of the sensor arrangement, the electronic device is configured to detect the electromagnetic radiation with the first wavelength.

The optoelectronic device is for example and is implemented as a photodetector or a photodiode, in particular being sensitive to infrared radiation.

According to some implementations of the optical sensor arrangement, the first wavelength range corresponds to or at least partially corresponds to infrared radiation.

According to some implementations of the sensor arrangement, the wavelength selective mirror is implemented as a dielectric mirror, a dichroic filter or an interference filter.

The wavelength selective mirror may comprise for example a stack of first and second dielectric layers, the first dielectric layers having a first refractive index and the second dielectric layers having a second refractive index. The first dielectric layers and the second dielectric layers are arranged alternatingly within the stack.

The passband of the wavelength selective mirror corresponds to a band of transmission. The stopband of the wavelength selective mirror corresponds to a band of reflectance.

The passband and the band of transmission, respectively, correspond to a wavelength range, where electromagnetic radiation with a wavelength within the passband is transmitted or substantially transmitted through the wavelength selective mirror. For example, a transmission for wavelengths within the passband lies above a specified first transmission threshold value, which may be for example 50%, 80%, 90% or 95%. Furthermore, a reflectance for wavelengths within the passband lies below a specified first reflectance threshold value, which may be for example 50%, 20%, 10% or 5%.

The stopband and the band of reflectance, respectively, correspond to a wavelength range, where electromagnetic radiation with a wavelength within the stopband is reflected or substantially reflected from the wavelength selective mirror. For example, a reflectance for wavelengths within the stopband lies above a specified second reflectance value, which may be for example 50%, 80%, 90% or 95%. Furthermore, a transmission for wavelengths within the stopband lies below a specified second transmission threshold value, which may be for example 50%, 20%, 10% or 5%.

The wavelength selective mirror is arranged such that visible light or infrared radiation, in particular infrared radiation having the first wavelength, entering the optoelectronic device to the aperture hits the wavelength selective mirror. In implementations where the electronic device is configured to emit the electromagnetic radiation, the wavelength selective mirror is arranged such that electromagnetic radiation, in particular having the first wavelength, being emitted by the optoelectronic device hits the wavelength selective mirror.

According to some implementations of the sensor arrangement, the wavelength selective mirror has a specified cutoff wavelength separating the passband from the stopband.

According to some implementations of the sensor arrangement, the wavelength selective mirror is implemented as a cold mirror, wherein the passband includes the first wavelength range and the stopband includes the second wavelength range.

Consequently, if the optoelectronic device is configured to emit electromagnetic radiation with the first wavelength, the emitted electromagnetic radiation passes the cold mirror and may exit the sensor arrangement through the aperture. Analogously, if the optoelectronic device is configured to emit electromagnetic radiation with the first wavelength, electromagnetic radiation corresponding to the first wavelength range entering the sensor arrangement through the aperture, passes the cold mirror and may reach the optoelectronic device.

On the other hand, visible light entering the sensor arrangement through the aperture is reflected or largely reflected from the cold mirror and does not reach the optoelectronic device. Instead, it may be directed to a target area of the optical sensor arrangement. Subsequently, the visible light may for example be reflected from the target area back to the cold mirror and then reflected from the cold mirror towards the aperture to leave the sensor arrangement. Consequently, an observer of the sensor arrangement may not or barely see the optoelectronic device.

According to some implementations of the sensor arrangement, the wavelength selective mirror is implemented as a hot mirror, wherein the stopband includes the first wavelength range and the passband includes the second wavelength range.

Consequently, if the optoelectronic device is configured to emit electromagnetic radiation with the first wavelength, the emitted electromagnetic radiation is reflected from the hot mirror and may exit the sensor arrangement through the aperture. Analogously, if the optoelectronic devices configured to emit electromagnetic radiation with the first wavelength, electromagnetic radiation corresponding to the first wavelength range entering the sensor arrangement through the aperture, is reflected from the hot mirror and may reach the optoelectronic device.

On the other hand, visible light entering the sensor arrangement through the aperture passes or largely passes the hot mirror and does not reach the optoelectronic device. Instead, it may be directed to the target area of the optical sensor arrangement. Subsequently, the visible light may for example be reflected from the target area back towards the aperture to leave the sensor arrangement. Consequently, an observer of the sensor arrangement may not or barely see the optoelectronic device.

According to some implementations of the optical sensor arrangement, the optoelectronic device has an active surface extending along a first principal plane and the wavelength selective mirror extends along a second principal plane. The second principal plane and the first principal plane include an angle with an absolute value being greater than 0° and less than 90°. In particular, a normal to the second principal plane, denoted as second normal in the following, and a normal to the first principal plane, denoted as first normal in the following, include the angle with an absolute value being greater than 0° and less than 90°.

According to some implementations of the optical sensor arrangement, the absolute value of the angle included by the first and the second principal plane and by the first and second normals, respectively, is 45° or approximately 45°, in particular is 45° up to respective manufacturing tolerances.

The passband and the stopband of the wavelength selective mirror are for example specified for light with a specified incident angle with respect to the wavelength selective mirror. For example, the passband and the stopband of the wavelength selective mirror may be specified for light with an incident angle with respect to the wavelength selective mirror corresponding to the angle included by the first and the second normal, for example corresponding to 45° or approximately 45°.

According to some implementations of the sensor arrangement, the mirror arrangement comprises an optically opaque element extending along a fourth principal plane being perpendicular to the first principal plane. The opaque element may for example comprise the target area of the optical sensor arrangement.

According to some implementations of the sensor arrangement, the passband includes the first wavelength range and the stopband includes the second wavelength range, in particular the wavelength selective mirror is implemented as a cold mirror. The cover arrangement extends along a third principal plane being parallel to the first principal plane.

The optoelectronic device and the aperture are located at opposite sides with respect to the wavelength selective mirror and the second principal plane, respectively. Consequently, electromagnetic radiation, in particular visible light, being reflected from the wavelength selective mirror does not reach the optoelectronic device, while electromagnetic radiation, in particular infrared radiation, entering through the aperture and passing the wavelength selective mirror may reach the optoelectronic device. Analogously, in case the optoelectronic device is configured to emit electromagnetic radiation, in particular infrared radiation, electromagnetic radiation being emitted by the optoelectronic device and passing the wavelength selective mirror may reach the aperture.

The aperture and the opaque element are located at the same side with respect to the wavelength selective mirror and the second principal plane, respectively. Consequently, electromagnetic radiation, in particular visible light, entering through the aperture and being reflected from the wavelength selective mirror may reach the opaque element. Electromagnetic radiation, in particular visible light, being reflected from the opaque element may be reflected by the wavelength selective mirror and reach the aperture.

According to some implementations of the sensor arrangement, the stopband includes the first wavelength range and the passband includes the second wavelength range, in particular the wavelength selective mirror is implemented as a hot mirror. The cover arrangement extends along a third principal plane being perpendicular to the first principal plane. According to some implementations, the third principal plane is parallel to the fourth principal plane.

The optoelectronic device and the aperture are located at the same side with respect to the wavelength selective mirror and the second principal plane, respectively. Consequently, electromagnetic radiation, in particular visible light, entering through the aperture and passing the wavelength selective mirror does not reach the optoelectronic device, while electromagnetic radiation, in particular infrared radiation, entering through the aperture and being reflected from the wavelength selective mirror may reach the optoelectronic device. Analogously, in case the optoelectronic device is configured to emit electromagnetic radiation, in particular infrared radiation, electromagnetic radiation being emitted by the optoelectronic device and being reflected from the wavelength selective mirror may reach the aperture.

The aperture and the opaque element are located at opposite sides with respect to the wavelength selective mirror and the second principal plane, respectively. Consequently, electromagnetic radiation, in particular visible light, entering through the aperture and passing the wavelength selective mirror may reach the opaque element. Electromagnetic radiation, in particular visible light, being reflected from the opaque element may pass the wavelength selective mirror and reach the aperture.

According to some implementations of the sensor arrangement, the mirror arrangement comprises the optically opaque element extending along the fourth principal plane being perpendicular to the first principal plane. The fourth principal plane is perpendicular or parallel to the third principal plane.

According to some implementations of the sensor arrangement, the mirror arrangement comprises a first prism body having the shape of a first prism with right triangles as bases and a second prism body having the shape of a second prism with right triangles as bases. The wavelength selective mirror is arranged between a first side face of the first prism body and a first side face of the second prism body. The first side face of the first prism body contains the hypotenuses of the bases of the first prism and the second side face of the second prism body contains the hypotenuses of the bases of the second prism.

In other words, the first side faces of the first and the second prism body correspond to the side faces of the first and the second prism body, respectively, lying opposite to the right angle of the first and the second prism, respectively, and the base triangles of the first and the second prism, respectively. The first side faces of the first and the second prism body are parallel to the second principal plane.

According to some implementations of the sensor arrangement, the first and the second prism have the same shape or approximately the same shape, in particular up to manufacturing tolerances.

According to some implementations of the sensor arrangement, the first and the second prism are non-truncated right triangular prisms. A non-truncated prism is characterized in that its base faces are parallel to each other. A right prism is characterized in that its side faces are perpendicular to its base faces.

According to some implementations of the sensor arrangement, the bases of the first and the second prism are right isosceles triangles. In such implementations, the wavelength selective mirror, in particular the second principal plane, includes an angle of 45° with each side face of the first and the second prism body except for the first side faces of the first and the second prism body.

According to some implementations of the sensor arrangement, the mirror arrangement, in particular the first and the second prism body, is arranged such that a second side face of the first prism body is perpendicular to the first principal plane and a second side face of the second prism body is parallel to the first principal plane. According to some implementations, the second side face of the first prism body is parallel to the fourth principal plane.

According to some implementations of the sensor arrangement, the first and the second prism body comprise or consist of an optically translucent or optically transparent material.

According to some implementations of the sensor arrangement, the optically translucent or transparent material comprises or consists of glass, acrylic glass, a polymer material and/or a plastic material.

According to some implementations of the sensor arrangement, the mirror arrangement comprises the optically opaque element and the optically opaque element is arranged on the second side face of the first prism body. The optoelectronic device faces the second side face of the second prism body. The aperture faces a third side face of the first prism body or a third side face of the second prism body.

According to some implementations of the sensor arrangement, the optically opaque element comprises or consists of an ink layer, a paint layer, a coating, a polymer or plastic material or glass.

According to some implementations of the sensor arrangement, no gap exists between the opaque element and the third side face of the first or the second prism body, respectively.

In this way, it may for example be ensured that light propagating through the first or the second prism body and reaching the respective third side face may be for the most part reflected from the opaque element and propagate back through the first or the second prism body, respectively.

According to some implementations of the sensor arrangement, the passband includes the first wavelength range and the stopband includes the second wavelength range, in particular the selective mirror is implemented as a cold mirror, the aperture faces the third side face of the first prism body.

Electromagnetic radiation, in particular infrared radiation, emitted by the optoelectronic device that passes the wavelength selective mirror may then exit the sensor arrangement through the aperture. Analogously, electromagnetic radiation, in particular infrared radiation entering through the aperture may pass the wavelength selective mirror and reach the optoelectronic device. Correspondingly, electromagnetic radiation, in particular visible light, entering the sensor arrangement through the aperture may be reflected by the mirror, hit the opaque element, be reflected from the opaque element and exit through the aperture.

According to some implementations of the sensor arrangement wherein the stopband includes the first wavelength range and the passband includes the second wavelength range, in particular the selective mirror is implemented as a hot mirror, the aperture faces the third side face of the second prism body.

Electromagnetic radiation, in particular infrared radiation, emitted by the optoelectronic device being reflected from the wavelength selective mirror may then exit the sensor arrangement through the aperture. Analogously, electromagnetic radiation, in particular infrared radiation entering through the aperture may be reflected from the wavelength selective mirror and reach the optoelectronic device. Correspondingly, electromagnetic radiation, in particular visible light, entering the sensor arrangement through the aperture may pass the wavelength selective mirror, hit the opaque element, be reflected from the opaque element, pass the wavelength selective mirror again and exit through the aperture.

According to some implementations of the sensor arrangement, the wavelength selective mirror is connected, in particular permanently connected, to the first and the second prism body, in particular to the first side faces of the first and the second prism body.

According to some implementations of the sensor arrangement, the wavelength selective mirror is deposited on the first side face of the first prism body and the first side face of the second prism body is glued the wavelength selective mirror. Alternatively, the wavelength selective mirror is deposited on the first side face of the second prism body and the first side face of the first prism body is glued to the wavelength selective mirror.

The wavelength selective mirror may for example be deposited on the first side face of first or the second prism body, respectively, by means of a chemical vapor deposition, CVD, or a physical vapor deposition, PVD, technique.

According to some implementations, the mirror arrangement comprises a glue layer arranged between the wavelength selective mirror and the first side face of the first or the second prism body.

According to some implementations of the sensor arrangement, the active surface of the optoelectronic device is in direct contact with the second side face of the first or the second prism body or no gap exists between the active surface and the second side face of the first or the second prism body.

According to some implementations of the sensor arrangement, the cover arrangement comprises an optically translucent or transparent cover plate and an optically opaque cover layer arranged on a surface of the cover plate facing the mirror arrangement. The optically opaque cover layer has an aperture of exposing an area of the cover plate defining the aperture of the cover arrangement.

According to some implementations of the sensor arrangement, the optically opaque cover layer comprises or consists of an ink layer, a paint layer, a coating, a polymer or plastic material or glass. In particular, the opaque cover layer may comprise or consist of the same material as the opaque element of the mirror arrangement.

According to some implementations of the sensor arrangement, a color of the opaque cover layer of the cover arrangement and a color of the opaque element of the mirror arrangement are adapted to each other, in particular the opaque cover layer and the opaque element may have the same color or approximately the same color, in particular up to respective tolerances.

Since from outside of the sensor arrangement one can effectively see the opaque element of the mirror arrangement instead of the aperture or the optoelectronic device, the aperture may effectively be not or barely be seen by an observer from outside of the sensor arrangement.

According to some implementations of the optical sensor arrangement, the optoelectronic device is configured to emit at least electromagnetic radiation with the first wavelength through the aperture, in particular through the mirror arrangement at the aperture. The optical sensor arrangement comprises a further optoelectronic device, wherein the cover arrangement covers the further optoelectronic device and the further optoelectronic device is configured to detect the at least electromagnetic radiation with the first wavelength entering the optoelectronic device through a further aperture of the cover arrangement.

The sensor arrangement comprises a further mirror arrangement arranged between the further optoelectronic device and the further aperture. The further mirror arrangement comprises a further wavelength selective mirror with a further passband and a further stopband. The further passband includes the first wavelength range and the further stopband includes the second wavelength range or vice versa.

What has been explained above with respect to the optoelectronic device, the aperture, the mirror arrangement and the wavelength selective mirror holds analogously for the further optoelectronic device, the further aperture, the further mirror arrangement and to further wavelength selective mirror, respectively.

In particular, the further mirror arrangement is implemented and arranged according to the explanations above with respect to the mirror arrangement. Therein, the mirror arrangement and the further mirror arrangement may be implemented equally or differently. In particular, the wavelength selective mirror and the further wavelength selective mirror may both be implemented as cold mirrors or may both be implemented as hot mirrors. Alternatively, the wavelength selective mirror may be implemented as a cold mirror and the further wavelength selective mirror is implemented as a hot mirror or vice versa.

According to some implementations, the optical sensor arrangement is a proximity sensor arrangement and is configured to detect a proximity a proximity of an object in a vicinity of the proximity sensor arrangement based on electromagnetic radiation being emitted by the optoelectronic device, at least partially reflected or scattered by the object and detected by the further optoelectronic device.

According to some implementations of the sensor arrangement, the optoelectronic device is implemented as an LED, a laser diode or a VCSEL, while the further optoelectronic device is implemented as a photodetector or a photodiode.

Various further implementations of the sensor arrangement comprising the optoelectronic device the further optoelectronic device, the mirror arrangement and the further mirror arrangement, are readily derived by combining the various implementations of the sensor arrangement described throughout the present disclosure with respect to the optoelectronic device and the mirror arrangement.

According to the improved concept also a proximity sensor arrangement is provided. The proximity sensor arrangement comprises an optical sensor arrangement according to the improved concept with the optoelectronic device, the further optoelectronic device, the mirror arrangement and the further mirror arrangement. The further optoelectronic device is configured to detect electromagnetic radiation being emitted by the optoelectronic device and reflected by an object in a vicinity of the optical sensor arrangement.

According to some implementations of the proximity sensor arrangement, the further optoelectronic device is configured to generate a sensor signal depending on the detected electromagnetic radiation. The proximity sensor arrangement further comprises a processing unit configured to compute a position information of the object depending on the sensor signal.

According to some implementations of the proximity sensor arrangement, the further optoelectronic device is configured to detect ambient light, for example ambient visible light, and to generate an ambient signal based on the detected ambient light. The processing unit is configured to generate a compensated sensor signal by adjusting the sensor signal by means of the ambient signal. The processing unit is further configured to compute the position information of the object depending on the compensated sensor signal.

In this respect, it is pointed out that a transmission of a cold mirror is for example not exactly zero for visible light. A fraction of visible light passing the cold mirror may be used to detect the ambient light. Analogously, a transmission of a hot mirror is for example not exactly 100% for visible light. A fraction of visible light being reflected by the hot mirror is for example used to detect ambient light.

In the following, the improved concept is explained in detail with the aid of exemplary implementations by reference to the drawings. Components that are functionally identical or have an identical effect may be denoted by identical references. Identical components and/or components with identical effects may be described only with respect to the figure where they occur first. Their description is not necessarily repeated in subsequent figures.

BRIEF DESCRIPTION OF THE FIGURES

FIG. 1A shows a cross section of an exemplary implementation of an optical sensor arrangement according to the improved concept. The optical sensor arrangement is for example a proximity sensor arrangement.

DETAILED DESCRIPTION

Figure 1A:
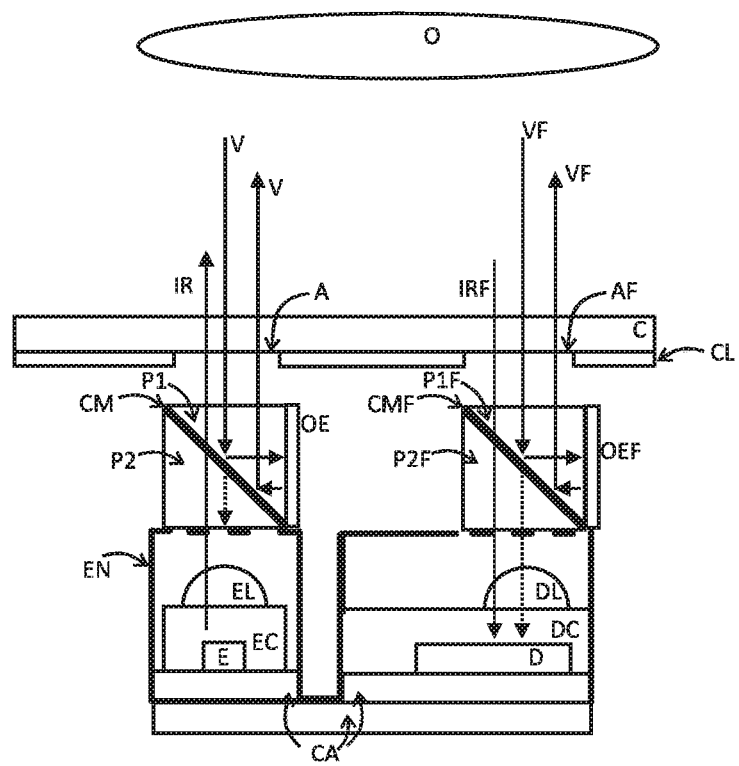
FIG. 1A shows a cross section of an exemplary implementation of an optical sensor arrangement according to the improved concept.

The sensor arrangement comprises an optoelectronic device, namely an optical emitter E, and a further optoelectronic device, namely an optical detector D, mounted on a carrier CA. The emitter E and the detector D may be electrically and/or mechanically connected to the carrier CA. The emitter E and the detector D are for example embedded within an emitter casting EC and a detector casting DC of the sensor arrangement, respectively. The sensor arrangement may also comprise an emitter lens EL mounted on the emitter casting EC above the emitter E and a detector lens DL mounted on the detector casting DC above the detector D. The arrangement further may comprise an encasement EN encasing at least partially the emitter E and/or the detector D. The emitter E and the detector D have respective active surfaces extending along or parallel to a first principle plane.

The sensor arrangement comprises a mirror arrangement comprising a first and a second prism body P1, P2 having the shapes of prisms with right isosceles triangles as bases. In particular, the first and the second prism bodies P1, P2 have the shape of non-truncated right triangular prisms. A wavelength selective mirror CM is connected to a first side face of the first prism body P1 and to a first side face of the second prism body P2. Thus, the wavelength selective mirror CM joins the first and the second prism body P1, P2. The first side faces of the first and the second prism body P1, P2 comprise the hypotenuses of the base triangles of the respective prism body P1, P2.

The mirror arrangement further comprises an optically opaque element OE arranged on a second side face of the first prism body P1. The opaque element OE is for example implemented as an ink layer, in particular a colored ink layer, for example a white or a black ink layer.

The sensor arrangement comprises for example a further mirror arrangement which is implemented for example analogously to the mirror arrangement. In particular, the first and the second prism body P1, P2, the wavelength selective mirror CM and the opaque element OE of the mirror arrangement corresponds to a first and a second further prism body P1F, P2F, a further wavelength selective mirror CMF and a further optically opaque element OEF, respectively.

Since the bases of the prism bodies P1, P2 are defined by right isosceles triangles, the wavelength selective mirror CM as well as the first side faces of the prism bodies P1, P2 extend along a second principal plane including an angle of 45° with the first principal plane.

The mirror arrangement is for example arranged above the emitter E such that a second side face of the second prism body P2 faces the active surface of the emitter E. Analogously, the further mirror arrangement is for example arranged above the detector D such that a second side face of the second further prism body P2F faces the active surface of the detector D. For example, the second side faces of the second prism body P2 and the second further prism body P2F may be arranged on respective positions of the encasement EN.

The sensor arrangement comprises a cover arrangement with a translucent or transparent cover plate C covering the emitter E, the detector D, the mirror arrangement and the further mirror arrangement. The cover plate C is for example made of glass of plastic and extends along a third principal plane being parallel to the first principal plane. The cover arrangement further comprises an optically opaque cover layer CL arranged on a surface of the cover plate C facing the mirror arrangement, the further mirror arrangement, the emitter E and the detector D.

The cover layer CL partially covers the cover plate C and in particular has openings or apertures exposing respective areas of the cover plate C and defining an aperture A and a further aperture AF of the cover arrangement. The aperture A is located above the mirror arrangement and above the emitter E, while the further aperture AF is located above the further mirror arrangement and above the detector D. Light can enter or leave the sensor arrangement through the aperture A and the further aperture AF.

The cover layer CL is for example implemented as an ink layer, in particular a colored ink layer, for example a white or a black ink layer. In particular, a color of the cover layer CL may be adapted or equal or approximately equal to a color of the opaque element OE and the further opaque element OEF.

The emitter and detector castings EC, DC are optional and may serve for example to protect the emitting and the detection device E, D, respectively, from mechanical damage, humidity, dust or other external influences. The emitter and detector lenses EL, DL are also optional and may serve for example for collimating and/or directing light emitted by the emitter E or to be detected by the detector D, respectively. The encasement PE is also optional and may further enhance mechanical stability of the sensor arrangement and/or protection of the emitter and the detector E, D from external influences. For light emitted by the emitter E to be able to leave the sensor arrangement and for light to be detected by the detector D to be able to reach the detector D, respectively, the optional encasement EN has openings or transparent or translucent areas located above the emitter E and the detector E, D, respectively, as indicated by horizontal dashed lines.

The wavelength selective mirror CM and the further wavelength selective mirror CMF are for example implemented as dielectric mirrors, in particular as cold mirrors. FIG. 1B shows transmission and reflection characteristics of a cold mirror, which may correspond to transmission and reflection characteristics of the cold mirrors CM, CMF used in the implementation of FIG. 1A. The axis of abscissae corresponds to the wavelength of light hitting the cold mirror under an angle of incidence of 45° or approximately 45°. The axis of ordinates corresponds to transmission and reflectance, respectively, in percent. The solid line corresponds to transmission, while the dotted line corresponds to reflectance.

One can see that the cold mirror has a cutoff wavelength at approximately 700 nm separating a passband and a stopband of the cold mirror from each other. The stopband extends approximately from 380 nm to 700 nm, where the reflectance is greater than approximately 50%. The passband extends approximately from 700 nm to above 1300 nm, where the transmission is greater than approximately 50%. Consequently, visible light hitting the cold mirror approximately 45° is largely reflected, while infrared radiation with a wavelength between 700 nm and 1300 nm hitting the cold mirror approximately 45° is largely transmitted.

Referring again to FIG. 1A, the emitter E is configured to emit electromagnetic radiation, in particular infrared radiation, for example with a first wavelength. The first wavelength may for example be or approximately be 850 nm or 950 nm. However, obviously infrared radiation with other wavelengths may be used. At least a part of the emitted infrared radiation IR may be emitted in a direction perpendicular to the first principal plane. The emitted radiation IR may then pass the second prism body P2 and hit the cold mirror CM under an angle of incidence of 45°. Consequently, as explained with respect to FIG. 1B, the emitted radiation IR passes or largely passes the cold mirror CM, passes the first prism body P1 and may leave the optical sensor arrangement through the aperture A.

Figure 1B:
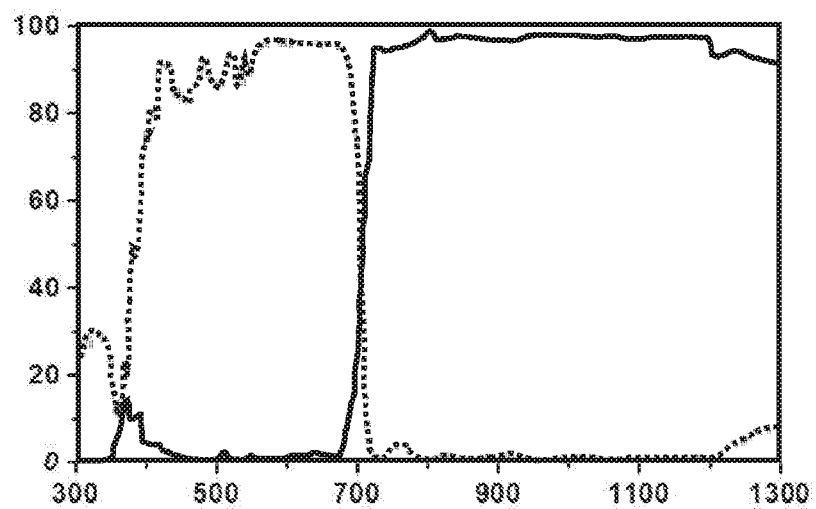
FIG. 1B shows a transmission and a reflectance curve as a function of wavelength of a wavelength selective mirror for being used in an exemplary implementation of an optical sensor arrangement according to the improved concept.

An external object O is also shown in FIG. 1A. The optical sensor arrangement is for example configured to determine a proximity of the object O by detecting, by means of the detector D, a fraction of light, in particular infrared radiation IRF, being emitted by the emitter E and reflected or scattered from the object O.

The reflected or scattered radiation IRF may for example enter the optical sensor arrangement through the further aperture AF, pass the first further prism body P1F and pass or largely pass the further cold mirror CMF, as explained with respect to FIG. 1B. The reflected or scattered radiation IRF may pass the second further prism body P2F and reach the detector D. The detector D may detect the reflected or scattered radiation IRF and for example generate a sensor signal based thereupon for determining the proximity of the object O.

In summary, the mirror arrangement has no or only very little effect on the emitted and the reflected or scattered infrared radiation IR, IRF due to the reflectance and transmission characteristics of the cold mirrors CM, CMF and the described arrangement of the mirror arrangement at the further mirror arrangement.

On the other hand visible light V, VF may enter the optical sensor arrangement through the aperture A or the further aperture AF, respectively. The visible light V, VF may pass the first or the first further prism bodies P1, P1F, respectively and hit the cold mirror CM or the further cold mirror CMF, respectively, under an angle of incidence of 45° or approximately 45°.

Consequently, as explained with respect to FIG. 1B, the visible light V, VF is reflected or largely reflected from the respective cold mirror CM, CMF and is directed to the opaque element OE or the further opaque element OEF, respectively. The visible light V, VF is then reflected from the respective opaque element OE, OEF and again hits the respective cold mirror CM, CMF under an angle of incidence of 45° or approximately 45°. Consequently, the visible light V, VF is again reflected or largely reflected from the respective cold mirror CM, CMF and may leave the sensor arrangement through the respective aperture A, AF.

As a consequence, an external observer looking at the sensor arrangement cannot or can barely see the emitter E and the detector D. If the colors of the cover layer CL and the opaque elements OE, OEF are adapted to each other, the observer also cannot or barely see the apertures A, AF.

As explained with respect to FIG. 1B, transmission for visible light of the cold mirrors CM, CMF is not exactly 0% but slightly larger, as indicated by dotted arrows in FIG. 1A. For example, the transmission for visible light of the cold mirrors CM, CMF may lie between 0% and 5% for example on average. This means, a small amount of visible light VF may reach the detector D. Based on the small amount of visible light VF reaching the detector D, an ambient light intensity may be determined by the sensor arrangement.

Figure 2A:
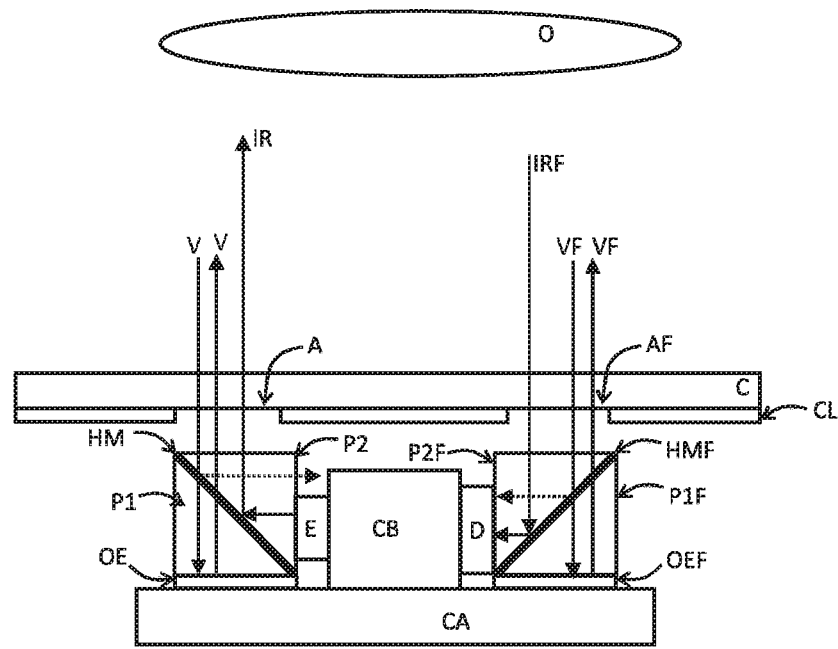
FIG. 2A shows a cross section of a further exemplary implementation of an optical sensor arrangement according to the improved concept.

FIG. 2A shows a cross section of a further exemplary implementation of an optical sensor arrangement according to the improved concept. The optical sensor arrangement is for example a proximity sensor arrangement.

The sensor arrangement comprises a carrier CA and a column body CB, for example having a cuboid shape, mounted on the carrier CA. The sensor arrangement further comprises an optoelectronic device, namely an optical emitter E, and a further optoelectronic device, namely an optical detector D, mounted on opposite side faces of the column body CB. The emitter E and the detector D may be electrically and/or mechanically connected to the column body CB. The emitter E and the detector D have respective active surfaces extending along a first principle plane. The first and the further first principle planes are for example perpendicular to a surface of the carrier CA on which the column body is mounted.

The sensor arrangement comprises a mirror arrangement comprising a first and a second prism body P1, P2 having the shapes of prisms with right isosceles triangles as bases. In particular, the first and the second prism bodies P1, P2 have the shape of non-truncated right triangular prisms. A wavelength selective mirror HM connected to a first side face of the first prism body P1 and to a first side face of the second prism body P2. Thus, the wavelength selective mirror HM joins the first and the second prism body P1, P2. The first side faces of the first and the second prism body P1, P2 comprise the hypotenuses of the base triangles of the respective prism body P1, P2.

The mirror arrangement further comprises an optically opaque element OE arranged on a second side face of the first prism body P1. The opaque element OE is for example implemented as an ink layer, in particular a colored ink layer, for example a white or a black ink layer.

The sensor arrangement comprises for example a further mirror arrangement which is implemented for example analogously to the mirror arrangement. In particular, the first and the second prism body P1, P2, the wavelength selective mirror HM and the opaque element OE of the mirror arrangement corresponds to a first and a second further prism body P1F, P2F, a further wavelength selective mirror HMF and a further optically opaque element OEF, respectively.

Since the bases of the prism bodies P1, P2 are defined by right isosceles triangles, the wavelength selective mirror HM as well as the first side faces of the prism bodies P1, P2 extend along a second principal plane including an angle of 45° with the first principal plane.

The mirror arrangement is for example arranged next to the emitter E such that a second side face of the second prism body P2 faces the active surface of the emitter E. Analogously, the further mirror arrangement is for example arranged next to the detector D such that a second side face of the second further prism body P2F faces the active surface of the detector D.

The sensor arrangement comprises a cover arrangement with a translucent or transparent cover plate C covering the emitter E, the detector D, the mirror arrangement and to further mirror arrangement. The cover plate C is for example made of glass of plastic and extends along a third principal plane being parallel to the first principal plane. The cover arrangement further comprises an optically opaque cover layer CL arranged on a surface of the cover plate C facing the mirror arrangement, the further mirror arrangement, the emitter E and the detector D.

The cover layer CL partially covers the cover plate C and in particular has openings or apertures exposing respective areas of the cover plate C and defining an aperture A and a further aperture AF of the cover arrangement. The aperture A is located above the mirror arrangement, while the further aperture AF is located above the further mirror arrangement. Light can enter or leave the sensor arrangement through the aperture A and the further aperture AF.

The cover layer CL is for example implemented as an ink layer, in particular a colored ink layer, for example a white or a black ink layer. In particular, a color of the cover layer CL may be adapted or equal or approximately equal to a color of the opaque element OE and the further opaque element OEF.

Figure 2B:
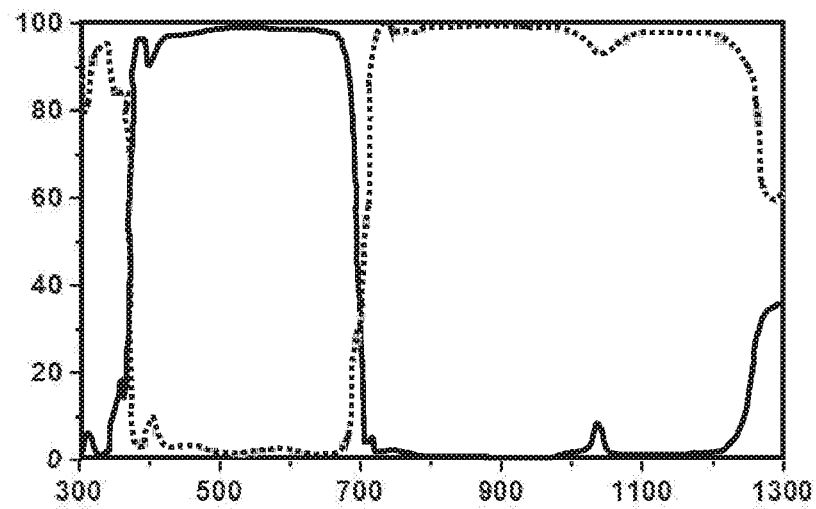
FIG. 2B shows a transmission and a reflectance curve as a function of wavelength of a further wavelength selective mirror for being used in an exemplary implementation of an optical sensor arrangement according to the improved concept.

The wavelength selective mirror HM and the further wavelength selective mirror HMF are for example implemented as dielectric mirrors, in particular as hot mirrors. FIG. 2B shows transmission and reflection characteristics of a hot mirror, which may correspond to transmission and reflection characteristics of the hot mirrors HM, HMF used in the implementation of FIG. 2A. The axis of abscissae corresponds to the wavelength of light hitting the hot mirror under an angle of incidence of 45° or approximately 45°. The axis of ordinates corresponds to transmission and reflectance, respectively, in percent. The solid line corresponds to transmission, while the dotted line corresponds to reflectance.

One can see that the hot mirror has a cutoff wavelength at approximately 700 nm separating a passband and a stopband of the hot mirror HM from each other. The stopband extends approximately from 700 nm to 1250 nm, where the reflectance is greater than approximately 50%. The passband extends approximately from 380 nm to 700 nm, where the transmission is greater than approximately 50%. Consequently, infrared radiation with a wavelength between 700 nm and 1250 nm hitting the hot mirror approximately 45° is largely reflected, while visible light hitting the cold mirror approximately 45° is largely transmitted.

Referring again to FIG. 2A, the emitter E is configured to emit electromagnetic radiation, in particular infrared radiation, for example with a first wavelength. The first wavelength may for example be or approximately be 850 nm or 950 nm. However, obviously infrared radiation with other wavelengths may be used. At least a part of the emitted infrared radiation IR may be emitted in a direction perpendicular to the first principal plane. The emitted radiation IR then may pass the second prism body P2 and hit the hot mirror HM under an angle of incidence of 45°. Consequently, as explained with respect to FIG. 2B, the emitted radiation IR is reflected or largely reflected from the hot mirror CM, passes the second prism body P2 towards the aperture A and may leave the optical sensor arrangement through the aperture A.

An external object O is also shown in FIG. 2A. The optical sensor arrangement is for example configured to determine a proximity of the object O by detecting, by means of the detector D, a fraction of light, in particular infrared radiation IRF, being emitted by the emitter E and reflected or scattered from the object O.

The reflected or scattered radiation IRF may for example enter the optical sensor arrangement through the further aperture AF, pass the second further prism body P2F and be reflected or largely reflected from further hot mirror HMF, as explained with respect to FIG. 2B. The reflected or scattered radiation IRF may pass the second further prism body P2F towards the detector D. The detector D may detect the reflected or scattered radiation IRF and for example generate a sensor signal based thereupon for determining the proximity of the object O.

In summary, the mirror arrangement has no or only very little effect on the emitted and the reflected or scattered infrared radiation IR, IRF due to the reflectance and transmission characteristics of the cold mirrors HM, HMF and the described arrangement of the mirror arrangement at the further mirror arrangement.

On the other hand visible light V, VF may enter the optical sensor arrangement to the aperture A or the further aperture AF, respectively. The visible light V, VF may pass the second or the second further prism bodies P2, P2F, respectively and hit the hot mirror HM or the further hot mirror HMF, respectively, under an angle of incidence of 45° or approximately 45°.

Consequently, as explained with respect to FIG. 2B, the visible light V, VF may pass or largely pass the respective hot mirror HM, HMF and be directed to the opaque element OE or the further opaque element OEF, respectively. The visible light V, VF is then reflected from the respective opaque element OE, OEF and again hits the respective hot mirror HM, HMF under an angle of incidence of 45° or approximately 45°. Consequently, the visible light V, VF again passes or largely passes the respective hot mirror HM, HMF and may leave the sensor arrangement through the respective aperture A, AF.

As a consequence, an external observer looking at the sensor arrangement cannot or can barely see the emitter E and the detector D. If the colors of the cover layer CL and the opaque elements OE, OEF are adapted to each other, the observer also cannot or barely see the apertures A, AF.

An arrangement as shown in FIG. 2A may have the advantage that the apertures A, AF and/or the devices E, D may not or barely be visible under a particularly large range of viewing angles. This may result from a reduced angular dependence of transmission of a hot or cold mirror compared to reflectance of the hot or cold mirror.

As explained with respect to FIG. 2B, transmission for visible light of the hot mirrors HM, HMF is not exactly 100% but slightly larger, as indicated by dotted arrows in FIG. 1A. For example, the transmission for visible light of the hot mirrors HM, HMF may lie between 95% and 100% for example on average. This means, a small amount of visible light VF may reach the detector D. Based on the small amount of visible light VF reaching the detector D, an ambient light intensity may be determined by the sensor arrangement.

It is pointed out that alternative implementations of a sensor arrangement according to the improved concept may comprise the mirror arrangement but not the further mirror arrangement or vice versa. For example, the sensor arrangement may comprise the emitter E and the mirror arrangement but neither the detector nor the further mirror arrangement or vice versa. In particular, the improved concept is not limited to proximity sensor arrangements. For example, the improved concept may analogously be used for a gesture sensor arrangement or an ambient light sensor arrangement.

Furthermore, alternative implementations of a sensor arrangement according to the improved concept may comprise a mirror arrangement with a cold mirror CM as in FIGS. 1A and 1B and a further mirror arrangement with a hot mirror as in FIGS. 2A and 2B.

Figure 3A:
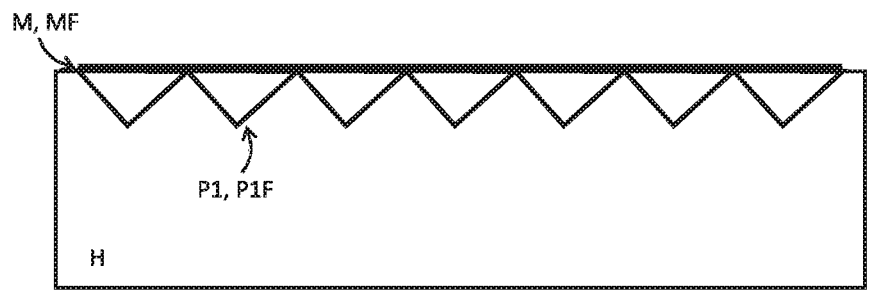
FIGS. 3A to 3C depict steps of a method for manufacturing a mirror arrangement for being used in an exemplary implementation of an optical sensor arrangement according to the improved concept.
Figure 3B:
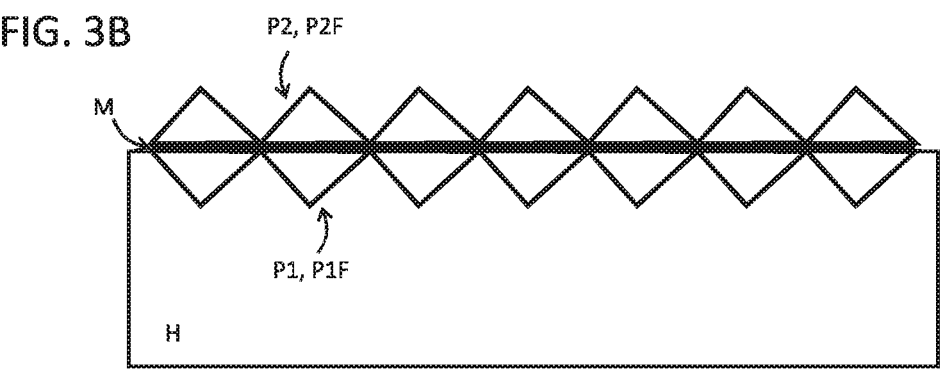
Figure 3C:
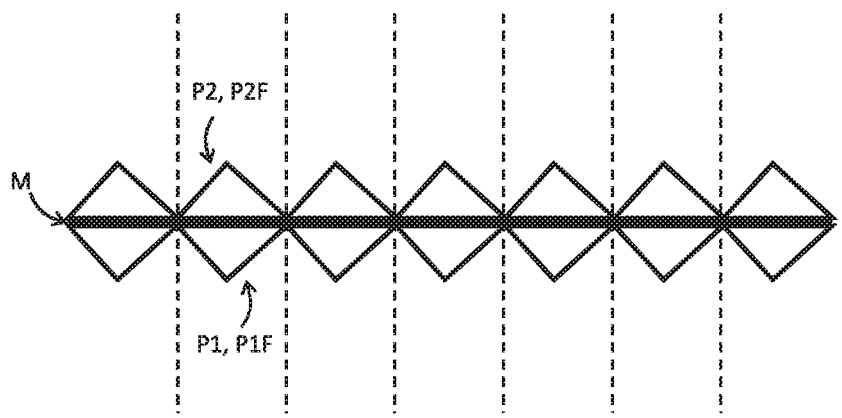

FIGS. 3A to 3C show steps of a method for manufacturing a mirror arrangement or a further mirror arrangement for being used in an exemplary implementation of an optical sensor arrangement according to the improved concept, for example an implementation as shown in FIG. 1A or 2A.

FIG. 3A shows a holder H holding a first prism array P1, P1F comprising one or more, for example seven, prism bodies corresponding for example to first prism bodies and/or further first prism bodies as described with respect to FIGS. 1A and 2A. Respective first side faces of the prism bodies of the first prism array P1, P1F are exposed to a top side of the holder. A mirror layer stack M, MF is deposited on the respective first side faces of the first prism array P1, P1F for example by means of a CVD or a PVD process. The mirror layer stack M, MF may for example constitute an interference filter, in particular a dielectric mirror. The mirror layer stack M, MF may for example constitute a cold mirror corresponding to the wavelength selective mirror CM and/or further wavelength selective mirror CMF of a sensor arrangement as described with respect to FIGS. 1A and 1B. Alternatively, the mirror layer stack M, MF may constitute a hot mirror corresponding to the wavelength selective mirror HM and/or further wavelength selective mirror HMF of a sensor arrangement as described with respect to FIGS. 2A and 2B.

FIG. 3B depicts the result of the method of manufacturing after a second prism array P2, P2F has been mounted on, for example glued to, the mirror layer stack M, MF. The second prism array P2, P2F comprises one or more, for example seven, prism bodies, in particular comprises as many prism bodies as the first prism array P1, P1F. The second prism array P2, P2F is mounted on the mirror layer stack M, MF such that respective first side faces of the prism bodies of the second prism array P2, P2F face the mirror layer stack M, MF. In particular, the second prism array P2, P2F is arranged such that each first side face of a prism body of the first prism array P1, P1F is congruently or approximately congruently covered by a first side face of a respective prism body of the second prism array P2, P2F.

FIG. 3C depicts the result of the method of manufacturing after the holder H has been removed from the first prim array P1, P1F. Subsequently, the first and the second prism array P1, P1F, P2, P2F as well as the mirror layer stack M, MF are for example cut or separated at positions between different portions, each portion comprising one of the prism bodies of the first prism array P1, P1F, a respective one of the prism bodies of the second prism array P2, P2F and a respective portion of the mirror layer stack M, MF arranged between said prism bodies of the first and the second prism array P1, P2F, P2, P2F.

Consequently, individual mirror layer arrangements and/or further mirror layer arrangements are described with respect to FIGS. 1A and 2A may be obtained. Obviously, the role first and the second prism array P1, P1F, P2, P2F may be interchanged in the method described in FIGS. 3A to 3B without changing the result of the method.

By means of the improved concept, an optical sensor arrangement is provided, wherein an aperture A, AF and/or an optoelectronic device E, D is disguised for an observer looking at the sensor arrangement. This is achieved by using hot and/or cold mirror beam splitters CM, CMF, HM, HMF to direct visible light to an opaque elements OE, OEF with a color adapted to the color of the cover layer CL. In this way an optical illusion is generated making the aperture A, AF and/or the optoelectronic device E, D effectively invisible to the human eye.

Since a sensor arrangement according to the improved concept is not limited by cosmetic considerations related to the visibility of the apertures A, AF, a greater distance between emitter E and detector D may be realized. This may lead to a reduced amount of optical cross talk in the sensor arrangement and thus to an improved accuracy or, for example in the case of a proximity sensor arrangement, to an improved detection range.

The invention claimed is:

1. An optical sensor arrangement comprising an optoelectronic device and a cover arrangement covering the optoelectronic device, wherein the optoelectronic device is configured to emit or detect at least electromagnetic radiation with a first wavelength through an aperture of the cover arrangement; and
a mirror arrangement arranged between the optoelectronic device and the aperture, the mirror arrangement comprising a wavelength selective mirror with a passband and a stopband, wherein
the optoelectronic device has an active surface extending along a first principal plane and the wavelength selective mirror extends along a second principal plane;
the second principal plane and the first principal plane include an angle with an absolute value being greater than zero degrees and less than ninety degrees;
the mirror arrangement further comprises
an optically opaque element extending along a fourth principal plane being perpendicular to the first principal plane;
the passband includes a first wavelength range containing the first wavelength and the stopband includes a second wavelength range corresponding to visible light or vice versa;
the active surface and the opaque element are located at opposite sides with respect to the wavelength selective mirror;
the wavelength selective mirror is adapted to direct visible light entering the optical sensor arrangement through the aperture to the opaque element; and
the wavelength selective mirror is configured to direct visible light being reflected from the opaque element to the aperture.

2. The optical sensor arrangement according to claim 1, wherein
the passband includes the first wavelength range and the stopband includes the second wavelength range; and
the cover arrangement extends along a third principal plane being parallel to the first principal plane.

3. The optical sensor arrangement according to claim 1, wherein
the stopband includes the first wavelength range and the passband includes the second wavelength range; and
the cover arrangement extends along a third principal plane being perpendicular to the first principal plane.

4. The optical sensor arrangement according to claim 1, wherein
the mirror arrangement comprises a first prism body having a shape of a first prism with right triangles as bases and a second prism body having the shape of a second prism with right triangles as bases,
the wavelength selective mirror is arranged between a first side face of the first prism body containing the hypotenuses of the bases of the first prism and a first side face of the second prism body containing the hypotenuses of the bases of the second prism.

5. The optical sensor arrangement according to claim 4, wherein the first and the second prism body comprise an optically translucent or transparent material.

6. The optical sensor arrangement according to claim 4, wherein
the mirror arrangement comprises an optically opaque element arranged on a second side face of the first prism body;
the optoelectronic device faces a second side face of the second prism body; and
the aperture faces a third side face of the first prism body or a third side face of the second prism body.

7. The optical sensor arrangement according to claim 6, wherein
the passband includes the first wavelength range and the stopband includes the second wavelength range; and
the aperture faces the third side face of the first prism body.

8. The optical sensor arrangement according to claim 6, wherein
the stopband includes the first wavelength range and the passband includes the second wavelength range; and
the aperture faces the third side face of the second prism body.

9. The optical sensor arrangement according to claim 4, wherein the wavelength selective mirror is permanently connected to the first side face of the first prism body and to the first side face of the second prism body.

10. The optical sensor arrangement according to claim 4, wherein the wavelength selective mirror is deposited on the first side face of the first prism body and the first side face of the second prism body is glued to the wavelength selective mirror or vice versa.

11. The optical sensor arrangement according to claim 1, wherein the cover arrangement comprises an optically translucent or transparent cover plate and an optically opaque cover layer arranged on a surface of the cover plate facing the mirror arrangement, wherein the cover layer has an aperture exposing an area of the cover plate defining the aperture of the cover arrangement.

12. The optical sensor arrangement according to claim 1, wherein the wavelength selective mirror is implemented as a dielectric mirror or a dichroic filter.

13. The optical sensor arrangement according to claim 1, wherein the optoelectronic device is configured to emit at least electromagnetic radiation with the first wavelength through the aperture and wherein the optical sensor arrangement further comprises:
a further optoelectronic device, wherein the cover arrangement covers the further optoelectronic device and the further optoelectronic device is configured to detect at least electromagnetic radiation with the first wavelength entering the optoelectronic device through a further aperture of the cover arrangement; and
a further mirror arrangement arranged between the further optoelectronic device and the further aperture, wherein the further mirror arrangement comprises a further wavelength selective mirror with a further passband and a further stopband, and the further passband includes the first wavelength range and the further stopband includes the second wavelength range or vice versa.

14. The optical sensor arrangement according to claim 13, wherein the further mirror arrangement further comprises a further optically opaque element, wherein the further wavelength selective mirror is adapted to direct visible light entering the optical sensor arrangement through the further aperture to the further opaque element.

15. An optical sensor arrangement comprising:

an optoelectronic device and a cover arrangement covering the optoelectronic device, wherein the optoelectronic device is configured to emit or detect at least electromagnetic radiation with a first wavelength through an aperture of the cover arrangement; and a mirror arrangement arranged between the optoelectronic device and the aperture, the mirror arrangement comprising a wavelength selective mirror with a passband and a stopband; wherein the optoelectronic device has an active surface extending along a first principal plane and the wavelength selective mirror extends along a second principal plane;

the second principal plane and the first principal plane include an angle with an absolute value being greater than zero degrees and less than ninety degrees;

the mirror arrangement further comprises an optically opaque element extending along a fourth principal plane being perpendicular to the first principal plane;

the passband includes a first wavelength range containing the first wavelength and the stopband includes a second wavelength range corresponding to visible light or vice versa;

the active surface and the opaque element are located at opposite sides with respect to the wavelength selective mirror;

the wavelength selective mirror is adapted to direct visible light entering the optical sensor arrangement through the aperture to the opaque element; and the cover arrangement comprises an optically opaque cover layer;

the opaque cover layer and the opaque element of the mirror arrangement have at least approximately the same color, wherein the opaque element is configured to reduce the visibility of the aperture from outside.

16. An optical sensor arrangement comprising:

an optoelectronic device and a cover arrangement covering the optoelectronic device, wherein the optoelectronic device is configured to emit or detect at least electromagnetic radiation with a first wavelength through an aperture of the cover arrangement; and a mirror arrangement arranged between the optoelectronic device and the aperture, the mirror arrangement comprising a wavelength selective mirror with a passband and a stopband; wherein the optoelectronic device has an active surface extending along a first principal plane and the wavelength selective mirror extends along a second principal plane;

the second principal plane and the first principal plane include an angle with an absolute value being greater than zero degrees and less than ninety degrees;

the mirror arrangement further comprises an optically opaque element extending along a fourth principal plane being perpendicular to the first principal plane;

the passband includes a first wavelength range containing the first wavelength and the stopband includes a second wavelength range corresponding to visible light or vice versa;

the active surface and the opaque element are located at opposite sides with respect to the wavelength selective mirror;

the wavelength selective mirror is adapted to direct visible light entering the optical sensor arrangement through the aperture to the opaque element; and the mirror arrangement comprises a first prism body having a shape of a first prism with right triangles as bases and a second prism body having the shape of a second prism with right triangles as bases;

the wavelength selective mirror is arranged between a first side face of the first prism body containing the hypotenuses of the bases of the first prism and a first side face of the second prism body containing the hypotenuses of the bases of the second prism;

the mirror arrangement comprises an optically opaque element arranged on a second side face of the first prism body;

the optoelectronic device faces a second side face of the second prism body; and the aperture faces a third side face of the first prism body or a third side face of the second prism body.

* * * * *